Jan. 15, 1963 J. L. JOHNSTON Re. 25,323

WELL COMPLETION TOOL

Original Filed Feb. 5, 1954 2 Sheets-Sheet 1

INVENTOR.
JAMES L. JOHNSTON
BY AUBREY C. JOHNSTON

Mellin and Hanscom
ATTORNEYS

Jan. 15, 1963 J. L. JOHNSTON Re. 25,323

WELL COMPLETION TOOL

Original Filed Feb. 5, 1954 2 Sheets-Sheet 2

INVENTOR.
JAMES L. JOHNSTON
BY AUBREY C. JOHNSTON

Mellin and Hanscom
ATTORNEYS

United States Patent Office

Re. 25,323
Reissued Jan. 15, 1963

25,323
WELL COMPLETION TOOL

James L. Johnston, Longview, Tex., assignor, by mesne assignments, to Johnston Testers, Inc., Houston, Tex., a corporation of Texas Original No. 2,760,581, dated Aug. 28, 1956, Ser. No. 408,368, Feb. 5, 1954. Application for reissue Aug. 26, 1958, Ser. No. 757,653
15 Claims. (Cl. 166—123)

Matter enclosed in heavy brackets [ ] appears in the original patent but forms no part of this reissue specification; matter printed in italics indicates the additions made by reissue.

This invention relates to a well completion tool and more particularly to a tool whereby any of a number of operations may be carried out in the well without requiring the removal of the tool from the well.

In the prior practice it was customary to employ a different tool for each of the operations of perforating, testing of formation pressure under either flowing or static conditions, squeeze cementing, acidizing, fracturing the formation by the hydrofrac process, or changing a bottom hole flow bean. Each change of tool required withdrawing the tubing string from the well, changing the tool, and then reinserting the tubing string.

It is the principal object of this invention to provide a tool whereby any or all of the above operations may be carried out without removing the [tool] *tubing string* from the well.

A further object of the invention is to provide a well tool having an inner mandrel removable through the tubing string by a wire line whereby the tool may be converted from one type of well operation to another merely by removing the inner mandrel and substituting a different mandrel of the proper configuration for the operation to be performed.

One form which the invention may assume is exemplified in the following description and illustrated by way of example in the accompanying drawings, in which.

Figure 1:
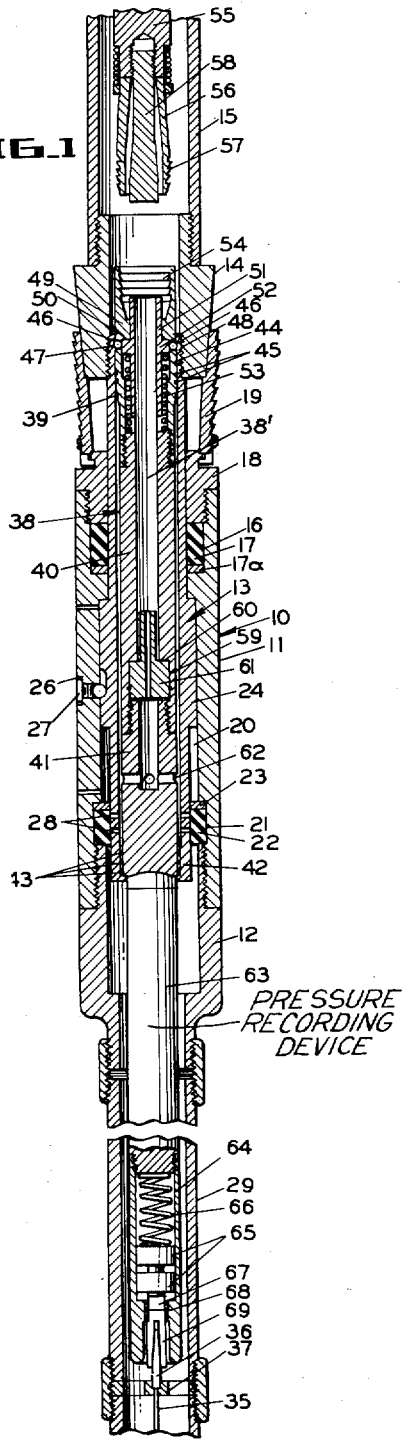
FIG. 1 shows a sectional view of the upper portion of a device embodying the principles of my invention.
Figure 2:
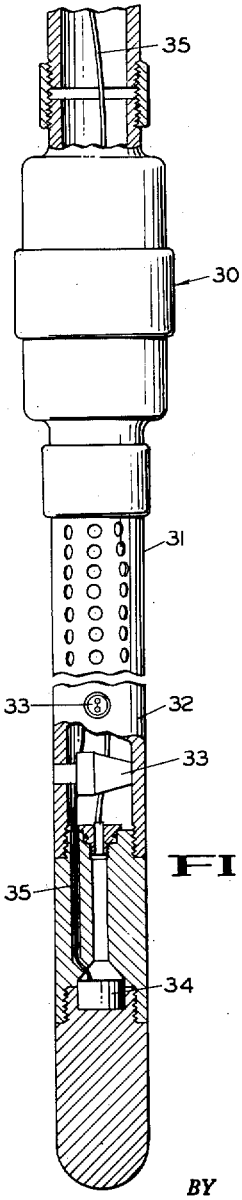
FIG. 2 shows the lower portion of the tool, certain portions thereof being shown in section.

Referring now to the drawings, there is disclosed a well tool having a housing generally indicated at 10, having upper and lower portions 11 and 12 threadedly fastened one to the other. An outer mandrel, generally indicated at 13, is slidably received within the tubular housing 11. The upper *or outer* end of the mandrel 13 is threadedly fastened to an upwardly and outwardly tapered slip cone 14. The upper end of the slip cone is threadedly engaged with the lower end of a tubing string indicated at 15. The upper end of the upper housing portion 11 is counterbored as shown at 16 to receive therewithin a packing retaining member 17a and an annular rubber packing 17, held in place by a packing nut 18 threaded into the upper end of the counterbore 16. The lower end of upper housing portion 11 is similarly counterbored, as shown at 21, to receive therein a packing retainer member 23 and an annular rubber packing 22 held in place by the upper portion of the lower housing member 12. A plurality of slips 19 are fastened to the upper end of the packing nut 18 and slidably engage the tapered surface of the slip cone 14.

The housing has an enlarged central bore 20 between the two packing members, which slidably receives an enlarged portion 24 on the outer surface of the mandrel 13. The length of the enlarged portion 20 of the housing is greater than the enlarged portion 24 of the mandrel to permit a limited longitudinal movement of the mandrel with respect to the housing.

Figure 3:
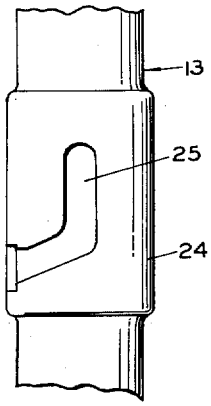
FIG. 3 is an enlarged view of a portion of the outer mandrel showing the J-slot for cooperation with the pin mounted in the housing.

As best shown in FIG. 3, the enlarged portion 24 of the mandrel has cut into the surface thereof a J-shaped slot 25. The housing has a bore through the wall thereof containing therein a ball 26, said ball being retained in said bore by a retaining member 27 threaded into the bore. The retaining member 27 forces the ball to extend inwardly of the inner surface of the housing into the J-slot 25 in the mandrel, thereby interconnecting the housing and mandrel for limited longitudinal movement [. When] *when* the ball is in the vertical portion of the J-slot, and locking said mandrel and said housing against relative longitudinal movement, when the mandrel is turned so that the ball is in the horizontal portion of the J-slot.

Lateral test ports 28 in the outer mandrel 13 provide communication between the interior and exterior of the mandrel. The test ports 28 are normally closed by the annular packing sleeve 22 when the mandrel is in its upper *or extended* position relative to the housing, and are adapted to be lowered out of said annular packing 22, when the mandrel is lowered relative to the housing *to its retracted position*, at which time fluid from within the housing is allowed to pass from the housing through the ports to within the outer mandrel 13.

The lower *or outer* end of the housing has attached thereto a tubular sub 29 which in turn is fastened to the upper end of a packer assembly 30. Attached to the lower end of the packer assembly 30 is a perforated well screen 31 and similarly fastened to the lower end of the perforated screen is a gun perforator 32 having a plurality of preforating guns 33 mounted therein. Fixed to the lower end of the gun perforator is a firing squib 34. An electrical conductor 35 extends upwardly from said firing squib through the perforated well screen and the packer assembly, and terminates at its upper end in an electrical terminal 36 supported by a spider 37 mounted in the tubular sub 29.

An inner tubular mandrel, generally indicated at 38, comprising an upper portion 39, an intermediate portion 40 and a lower portion 41, is adapted to be detachably secured within the outer tubular mandrel 13. The lower *or inner* end of the outer tubular mandrel 13 has a portion *42* of reduced internal diameter adjacent its lower end. Said reduced portion carries on its inner surface a plurality of *annular sealing rings or* O-rings 43 for sealing engagement with the inner mandrel. The upper end of the inner mandrel has an enlarged head portion and similarly carries a plurality of O-rings 45 in sealing engagement with the inner surface of the outer tubular mandrel 13.

The means connecting the two mandrels together comprise a plurality of lateral bores 46 through the walls of the inner tubular mandrel, and a plurality of balls 47 mounted one in each of said lateral bores 46. The balls 47 are adapted to seat in an annular groove *or seat* 48 provided in the inner surface of the outer tubular mandrel 13. Above the lateral bores 46 the inner mandrel has a portion 49 of reduced internal diameter providing a downwardly facing annular shoulder 50. A latch locking member 51 is slidably received within said reduced annular portion 49. The lock member 51 is enlarged below the shoulder 50, as shown at 52, to abut against the balls 47 and force them outwardly into the groove 48. A spring 53 abuts against the lower surface of the enlarged portion 52 of the locking member and against the upper end of the intermediate mandrel portion 40 and urges the locking member 51 upwardly towards its locking position.

Above the reduced diameter portion 49 the upper member 39 of the inner mandrel is provided with a plurality of downwardly facing internal ratchet teeth 54. A retrieving member 55, adapted to be lowered by means of a wire line or the like, has a plurality of depending spring fingers 56, each of which has on its lower end a plurality of external upwardly facing ratchet teeth 57 whereby when the retrieving member 55 is lowered, the spring fingers 56 will enter within the upper end of the inner mandrel and the ratchet teeth 57 will engage with the ratchet teeth 54 and permit the retrieving member to pull the inner mandrel up out of the outer mandrel 13 to the surface. The retrieving member has a depending central latch operating member 58 which is adapted to engage the upper end of the latch locking member 51 and depress the same against the action of the spring 53, thus depressing the enlarged portions 52 to below the location of the balls 47, permitting the balls to move inwardly and disengage from the annular groove 48 in the outer mandrel and release the inner mandrel from the outer mandrel.

The lower end of the intermediate portion 40 of the inner mandrel 38 is counterbored as shown at 59. A choke orifice 61 is inserted in the counterbored portion of the mandrel and seats against the shoulder 60 formed by said counterbore. The lower portion of the inner mandrel is threaded into the intermediate portion and the upper surface thereof abuts against the lower surface of the choke member to retain said choke member in place. The inner mandrel is provided with a plurality of lateral ports 62 below the choke member and between the O-rings 43 and 45, providing communication between the outer portion of the mandrel 38 and a central passage 38' therethrough. Passage 38' is closed at its lower [and] *end* and communicates with the passage through the well string at its upper end.

Connected to the lower end of the intermediate mandrel 38 is a pressure recording device 63. The pressure recording device 63 may be any suitable device designed for the purpose of recording pressures in oil wells. Fixed to the lower end of the pressure recording device is a battery compartment 64 containing a plurality of batteries pressed downwardly by means of a spring 66. The batteries 65 are connected by a connector 67, insulated from the battery case by insulation shown at 68, to a terminal 69 which is adapted to engage the terminal 37 on the upper end of the electrical conduit 35 when the mandrel 38 is properly seated in mandrel 13.

Figure 4:
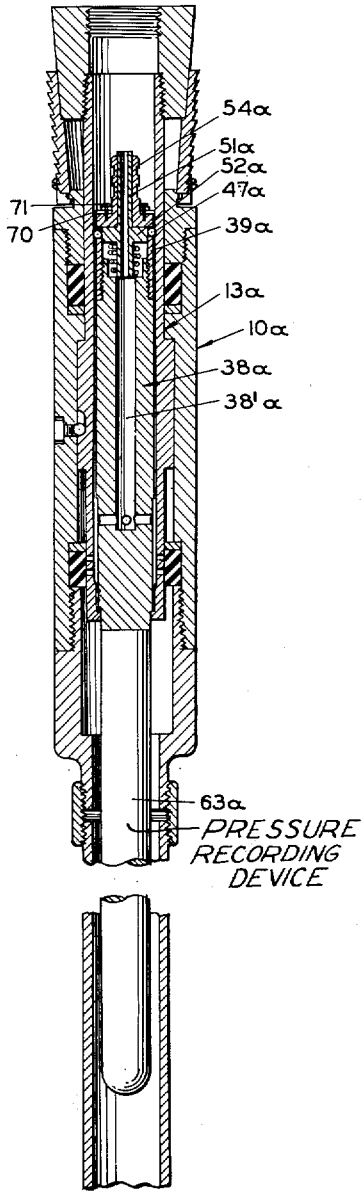
FIG. 4 is a sectional view of a modification of the device shown in FIG. 1.
Figure 5:
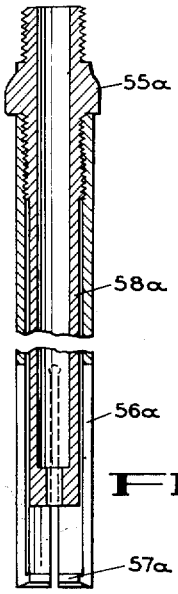
FIG. 5 shows a modified form of retrieving member for cooperation with the modification shown in FIG. 4.

In the modification shown in FIG. 4, similar parts are given similar reference numerals with the postscript "a." In this modification the upper end of the inner mandrel is of reduced external diameter and has a plurality of grooves in its external surface forming downwardly facing ratchet teeth 54a for cooperation with a retrieving member such as shown in FIG. 5. The retrieving member shown in FIG. 5 has a plurality of spring fingers 56a, each having an inwardly facing shoulder 57a adjacent the lower end thereof. The retrieving member is also provided with a depending central portion 58a for engagement with the upper end of the latch locking member 51a to release the latch balls 47a to permit the removal of the inner mandrel from the outer mandrel. It will be noted that there is no choke orifice provided in this modification and that the pressure recorder 63a does not have the battery chamber and firing mechanism attached to the lower end thereof. The pressure recording device 63a may be any suitable device designed for the purpose of recording pressures in oil wells.

If it is desired to make a flow test or shut-in test of a well having a tool such as is described herein already in place in the well, it is merely necessary to lower a mandrel such as 38a, shown in FIG. 4, to perform the necessary test operations and then the mandrel may again be withdrawn from the well.

The operation of the device is as follows: The device, with the inner mandrel 38 removed, is lowered into the well by means of the tubing string 15. When the tool has been located in its proper position and the packer properly set, the inner mandrel 38 is lowered within the string 15. When the inner mandrel 38 seats and locks within the outer mandrel 13, the terminal 69 engages the terminal 36 and fires the gun perforator 32 to perforate the walls of the well and permit the well fluid to flow into the perforated screen 31 through the packer assembly 30 into the housing 10.

When it is desired to take a flow test, the string 15 is rotated in a direction to place the ball 26 in the vertical portion of the J-slot 25 and the string is lowered to lower the outer mandrel relative to the housing 10 to lower the ports 28 out of the annular packing ring 22. The fluid from the housing is thus permitted to flow through the ports 28 into the central bore of the outer mandrel 13, through the ports 62 in the mandrel 38 into the longitudinal passage 38', through the orifice 61, and through the well string 15 up to the surface. The pressure recorder 63, being located below the lower end of the outer mandrel, is exposed to the pressure in the housing 10 at all times.

When it is desired to record the shut-in or static pressure of the formation, the mandrel 13 is raised with respect to the housing 10 and rotated to place the ball 26 in the horizontal portion of the J-slot 25 to lock the mandrel in the upper position, thereby moving the ports 28 up into the annular packing ring 22 and shutting off the fluid flow therethrough.

After the test has been completed, the retrieving member 55 is lowered down on a wire line (not shown). The portion 58 of the retrieving member contacts the upper end of the latch locking member 51 and releases the lock, and the ratchet teeth 57 engage the ratchet teeth 54 on the mandrel and the mandrel may be withdrawn from the well without removing the tool body from the well. In this condition, with the inner mandrel removed, the well can be placed in production, since the removal of the inner mandrel leaves an unobstructed central bore through the device, or further operations may be carried out by inserting a different inner mandrel having a proper configuration suited to the operation desired. For example, a mandrel such as shown in FIG. 4 would be used to make a flow test or shut-in test of the well pressure after the well has been put in production.

While we have shown the preferred form of our invention, it is to be understood that various changes may be made in its construction by those skilled in the art without departing from the spirit of the invention as defined in the appended claims.

Having thus described [our] *my* invention, what [we] *I* claim and desire to secure by Letters Patent is:

1. A well tool comprising a housing, an outer tubular mandrel slidably received within said housing and adapted to be attached at its upper end to a tubing string, means connecting said outer mandrel and housing for limited longitudinal movement in either direction relative to each other, a sleeve fixed in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, and test ports in said inner mandrel in fluid communication with the test ports in said outer mandrel.

2. A well tool comprising a housing, an outer tubular mandrel slidably received within said housing and adapted to be attached at its upper end to a tubing string, means connecting said outer mandrel and housing for limited longitudinal movement in either direction relative to each other, a sleeve fixed in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, and a pressure recorder fixed to the lower end of said inner mandrel.

3. A well tool comprising a housing, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, and means adapted to be lowered on a wire line for releasing said locking means and withdrawing said inner mandrel from the well.

4. A well tool comprising a housing, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, a pressure recorder fixed to the lower end of said inner mandrel, and means adapted to be lowered on a wire line for releasing said locking means and withdrawing said inner mandrel from the well.

5. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, and test ports in said inner mandrel in fluid communication with the test ports in said outer mandrel.

6. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, and a pressure recorder fastened to the lower end of said inner mandrel.

7. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, and means adapted to be lowered on a wire line for releasing said locking means and withdrawing said inner mandrel from the well.

8. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel with said outer mandrel for movement therewith, test ports in said inner mandrel in fluid communication with the test ports in said outer mandrel, a pressure recorder fastened to the lower end of said inner mandrel, and means adapted to be lowered on a wire line for releasing said locking means and withdrawing said inner mandrel from the well.

9. A well tool comprising a housing, a packer device fastened to the lower end of the housing, a perforated screen fastened below the packer device, an electrically operated well perforating gun fastened to the lower end of said perforated screen, an electrical conduit connected to said perforating gun and extending upwardly through said screen and packing device, and having a terminal at its upper end, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, and test ports in said inner mandrel in fluid communication with the test ports in said outer mandrel.

10. A well tool comprising a housing, a packer device fastened to the lower end of the housing, a perforated screen fastened below the packer device, an electrically operated well perforating gun fastened to the lower end of said perforated screen, an electrical conduit connected to said perforating gun and extending upwardly through said screen and packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, means for releasably locking said inner mandrel within said outer mandrel for movement therewith, test ports in said inner mandrel in fluid communication with the test ports in said outer mandrel, and means adapted to be lowered on a wire line for releasing said locking means and withdrawing said inner mandrel.

11. A well tool comprising a housing, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, a choke orifice in said inner mandrel, means for releasably locking said inner mandrel within said outer mandrel for movement therewith, and test ports in said inner mandrel being in fluid communication with the test ports in said outer mandrel.

12. A well tool comprising a housing, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, a choke orifice in said inner mandrel, means for releasably locking said inner mandrel within said outer mandrel for movement therewith, test ports in said inner mandrel in fluid communication with the test ports in said outer mandrel, a pressure recorder fixed to the lower end of said inner mandrel, and means adapted to be lowered on a wire line for releasing said locking means and withdrawing said inner mandrel from the well.

13. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, a choke orifice in said inner mandrel, means for releasably locking said inner mandrel within said outer mandrel for movement therewith, and test ports in said inner mandrel in fluid communication with the test ports in said outer mandrel.

14. A well tool comprising a housing, a packer device fastened to the lower end of the housing, a perforated screen fastened below said packing device, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, a choke orifice in said inner mandrel, means for releasably locking said inner mandrel within said mandrel in fluid communication with the test ports in said outer mandrel, a pressure recorder fastened to the lower end of said inner mandrel, and means adapted to be lowered on a wire line for releasing said locking means and withdrawing said inner mandrel from the well.

15. A well tool comprising a housing, a packer device fastened to the lower end of the housing, a perforated screen fastened below the packer device, an electrically operated well perforating gun fastened to the lower end of said perforated screen, an electrical conduit connected to said perforating gun and extending upwardly through said screen and packing device and having a terminal at its upper end, an outer tubular mandrel slidably received within said housing and adapted to be attached at its upper end to a tubing string, means connecting said outer mandrel and housing for limited longitudinal movement relative to each other, a sleeve in said housing through which said outer mandrel extends, test ports in said outer mandrel adapted to be closed by said sleeve when said mandrel is in its upper position relative to said housing, an inner tubular mandrel closed at its lower end adapted to be slidably received within said outer mandrel, a choke orifice in said inner mandrel, means for releasably locking said inner mandrel within said outer mandrel for movement therewith, and test ports in said inner mandrel in fluid communication with the test ports in said outer mandrel.

References Cited in the file of this patent or the original patent

UNITED STATES PATENTS

| | | |
|---|---|---|
| 1,875,006 | Humanson | Aug. 30, 1932 |
| 2,214,551 | Edwards | Sept. 10, 1940 |
| 2,633,200 | Humanson | Mar. 31, 1953 |
| 2,667,926 | Alexander | Feb. 2, 1954 |